(12) United States Patent
Yi et al.

(10) Patent No.: US 8,953,237 B2
(45) Date of Patent: Feb. 10, 2015

(54) SPECTRUM SLICED PHOTONIC SIGNAL PROCESSOR

(75) Inventors: Xiaoke Yi, New South Wales (AU); Tong Chen, New South Wales (AU); Thomas Huang, New South Wales (AU); Robert Minasian, New South Wales (AU)

(73) Assignee: The University of Sydney, New South Wales (AU)

( * ) Notice: Subject to any disclaimer, the term of this patent is extended or adjusted under 35 U.S.C. 154(b) by 158 days.

(21) Appl. No.: 13/383,140

(22) PCT Filed: Jul. 8, 2010

(86) PCT No.: PCT/AU2010/000870
§ 371 (c)(1),
(2), (4) Date: Jan. 9, 2012

(87) PCT Pub. No.: WO2011/003144
PCT Pub. Date: Jan. 13, 2011

(65) Prior Publication Data
US 2012/0113494 A1 May 10, 2012

(30) Foreign Application Priority Data
Jul. 9, 2009 (AU) ................................. 2009903215

(51) Int. Cl.
G02B 26/00 (2006.01)
G02B 6/02 (2006.01)
(52) U.S. Cl.
CPC ........ *G02B 6/02204* (2013.01); *G02B 6/02085* (2013.01); *H04B 2210/006* (2013.01)
USPC ........................................................ 359/238
(58) Field of Classification Search
CPC ........ G02F 1/01; G02B 1/00; G02B 6/12004; G02B 2006/12107; H01S 3/0057
USPC .................. 359/237, 238; 385/10; 372/50.11
See application file for complete search history.

(56) References Cited

U.S. PATENT DOCUMENTS 5,650,856 A * 7/1997 Morse ........................... 356/436
5,748,312 A 5/1998 Kersey et al.
(Continued)

FOREIGN PATENT DOCUMENTS

WO 03103192 A1 12/2003
WO 2006072759 A2 7/2006

OTHER PUBLICATIONS

Notification of Transmittal of the International Search Report and the Written Opinion of the International Searching Authority, or the Declaration issued by the International Searching Authority in the corresponding international application.
(Continued)

*Primary Examiner* — Tuyen Tra
(74) *Attorney, Agent, or Firm* — Jason P. Mueller; Adams and Reese LLP

(57) ABSTRACT

A photonic signal processor providing finite impulse response filtering of an external input signal, the processor including: a photonic signal input having a predetermined wavelength range, a Bragg grating structure interconnected to the photonic signal input and having a series of localized modifications to the periodicity of the grating structure so as to provide a predetermined transmission output window within the stopband of the Bragg grating structure and predetermined wavelength range; a modulator interconnected to the grating structure for modulating the output from the grating structure in accordance with the external signal input; a delay structure for providing a wavelength variable delay to the output from the modulator; an intensity detector interconnected to the delay structure for determining and outputting the intensity of the delay structure output.

16 Claims, 6 Drawing Sheets

(56) References Cited

U.S. PATENT DOCUMENTS 8,432,153 B2 * 4/2013 Gupta et al. .................. 324/96
2007/0196048 A1 8/2007 Galvanauskas et al.

OTHER PUBLICATIONS

J. Mora, B. Ortega, J. Capmany, J. L. Cruz, M. V. Andres, D. Pastor, and S. Sales, "Automatic tunable and reconfigurable fiberoptic microwave filters based on a broadband optical source sliced by uniform fiber Bragg gratings," Optics Express, vol. 10, pp. 1291-1298, Nov. 4, 2002.

J. Capmany, D. Pastor, and B. Ortega, "Fibre optic microwave and millimetre-wave filter with high density sampling and very high sidelobe suppression using subnanometre optical spectrum slicing," Electronics Letters, vol. 35, pp. 494-496, Mar. 18, 1999.

J. S. Leng, W. Zhang, and J. A. R. Williams, "Optimization of superstructured fiber Bragg gratings for microwave photonic filters response," IEEE Photonics Technology Letters, vol. 16, pp. 1736-1738, Jul. 2004.

J. Capmany, D. Pastor, A. Martinez, B. Ortega, and S. Sales, "Microwave photonic filters with negative coefficients based on phase inversion in an electro-optic modulator," Optics Letters, vol. 28, pp. 1415-1417, Aug. 15, 2003.

* cited by examiner

The heat distribution along the grating is also obtained and is shown in the following figure. The x-axis is the recorded temperature and y-axis shows the relative heating distance along the grating. It can be seen that the heat shows a Gaussian distribution profile and the maximum required heat to create a closed to 180 phase shift is 60 degree.

Measured spectrum sliced source with four induced transmission windows

SPECTRUM SLICED PHOTONIC SIGNAL PROCESSOR

CROSS REFERENCE TO RELATED APPLICATIONS

This application is the National Stage of International Application No. PCT/AU2010/000870, filed Jul. 8, 2010, which claims priority to prior Australian application number 2009903215, filed Jul. 9, 2009.

FIELD OF THE INVENTION

The present invention relates to the field of optical signal processing of high speed signals such as microwave signals and in particular discloses an optical processor having a tunable and reconfigurable finite impulse response (FIR) filter topology with bipolar taps.

BACKGROUND

Photonic signal processing using optical delay line structures is a highly powerful technique in processing high speed signals, such as microwave signals, directly in optical domain because it can overcome the inherent electronic bottlenecks caused by limited sampling speed in conventional electronics signal processors, such as Digital Signal Processing (DSP) processors, and also offers attractive features such as tunability, low loss, large time-bandwidth product and immunity to electromagnetic interference (EMI). Photonic signal processing has particular application in satellite and optical fiber communications, radio-over-fiber, radioastronomy, radar and warfare systems.

Spectrum slicing of a broadband light source has been proposed as a low-cost solution for realizing multiple taps. There have been many reported photonics signal processor structures. Proposed systems for photonic microwave filtering are discussed in: J. Mora, B. Ortega, J. Capmany, J. L. Cruz, M. V. Andres, D. Pastor, and S. Sales, "Automatic tunable and reconfigurable fiberoptic microwave filters based on a broadband optical source sliced by uniform fiber Bragg gratings," Optics Express, vol. 10, pp. 1291-1298, Nov. 4 2002; J. Capmany, D. Pastor, and B. Ortega, "Fibre optic microwave and millimeter-wave filter with high density sampling and very high sidelobe suppression using subnanometer optical spectrum slicing," Electronics Letters, vol. 35, pp. 494-496, Mar. 18 1999. J. S. Leng, W. Zhang, and J. A. R. Williams, "Optimization of superstructured fiber Bragg gratings for microwave photonic filters response," IEEE Photonics Technology Letters, vol. 16, pp. 1736-1738, July 2004.

The aforementioned articles include a discussion of spectrum slicing of amplified spontaneous emission (ASE) from an erbium-doped fiber amplifier (EDFA) using Fabry-Perot filters or superstructure gratings. These normally have limitations in terms of tunability and weighting adjustment. Mora et al also disclose slicing using mechanical techniques based on the strain tuning of an array of fiber Bragg gratings to change their centre wavelengths. However, this approach requires N gratings for N taps which is inefficient for many taps, and moreover for windowing and sidelobe suppression it requires a multiport optical coupler and an array of variable attenuators which increases the insertion loss and complexity for realizing a large number of filter taps.

SUMMARY

It is an object of the present invention to provide an improved form of photonic signal processor.

In accordance with a first aspect of the present invention, there is provided a method of filtering an external input signal, the method including the steps of: (a) providing a photonic signal input having a predetermined wavelength range, (b) filtering the photonic signal input utilising a Bragg grating structure having a series of localised modifications to the periodicity of the grating structure so as to provide a predetermined transmission output window within the stopband of the Bragg grating structure to provide a first filtered output; and (c) utilising the external input signal to modulate the first filtered output so as to provided a modulated output.

The method may further includes the steps of: (d) applying a wavelength variable delay to the modulated output to provide a delayed modulated output; and (e) determining the time varying intensity of the delayed modulated output.

In accordance with a further aspect of the present invention, there is provided a photonic signal manipulation apparatus, including: a photonic signal input having a predetermined wavelength range, a Bragg grating structure interconnected to the photonic signal input and having a series of localised modifications to the periodicity of the grating structure so as to provide a predetermined transmission output window within the stopband of the Bragg grating structure and predetermined wavelength range; a modulator interconnected to the grating structure for modulating the output from the grating structure in accordance with an external signal input.

The apparatus may include a delay structure for providing a wavelength variable delay to the output from the modulator; and an intensity detector interconnected to the delay structure for determining and outputting the intensity of the delay structure output.

The Bragg grating structure may include a first and second chirped Bragg grating on separate interconnected arms with one arm providing a 180 degree phase difference output to the other arm, thereby providing negative coefficient outputs for an optical filter.

In accordance with a further aspect of the present invention, there is provided a photonic signal processor providing finite impulse response filtering of an external input signal, the processor including: a photonic signal input having a predetermined wavelength range, a Bragg grating structure interconnected to the photonic signal input and having a series of localised modifications to the periodicity of the grating structure so as to provide a predetermined transmission output window within the stopband of the Bragg grating structure and predetermined wavelength range; a modulator interconnected to the grating structure for modulating the output from the grating structure in accordance with the external signal input; a delay structure for providing a wavelength variable delay to the output from the modulator; an intensity detector interconnected to the delay structure for determining and outputting the intensity of the delay structure output.

The localised modification can be provided by localised heating of the Bragg grating structure. The localised heating changes the grating period and the refractive index at the localised point thereby introducing a phase shift in the grating at the localised point. The manipulation of the phase control is performed by predetermined profile of heating distribution. The localised heating distribution can be individually modified in respect of the selected heat width and heat amount.

The localised modification can also be provided by localised pressure of the Bragg grating structure. For example, localised strain can change the grating period and the refractive index at the contacting point and split the original grating into two sub-gratings thereby introducing a phase shift in the grating. The grating position and applied force can be used to control the phase shift.

The Bragg grating structure may include a first and second chirped Bragg grating on separate interconnected arms with one arm providing a 180 degree phase difference output to the other arm, thereby providing negative coefficient outputs for the finite impulse response filter.

The localised modification can be variable in intensity and reversible. The Bragg grating structure can be a chirped Bragg grating. The delay structure may include a reflection Bragg grating.

In an exemplary embodiment, the time varying intensity of the delayed modulated output is provided after photodetection. The photonic signal processor can therefore be used to filter an external input signal (RF/Microwave/Millimeter wave) that modulates the first filtered output and the output of the FIR filtering is the signal (RF/Microwave/Millimeter wave) received after photodetection.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Exemplary embodiments of the present invention will now be described, by way of example only, with reference to the accompanying drawings.

A first exemplary embodiment provides a new photonic signal processor based on a thermally controlled spectrum sliced optical source, requiring two identical linearly chirped fiber Bragg gratings (LCFBGs), which readily provides for windowing, and can generate multiple taps together with tunability, reconfigurability and low-cost.

Figure 1:
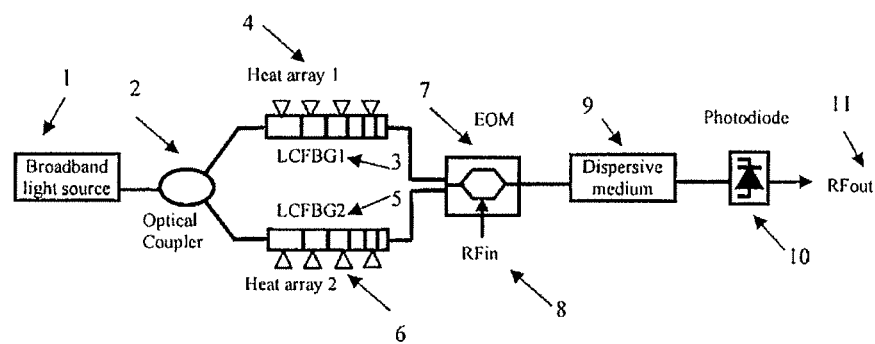
FIG. 1 provides a schematic illustration of an exemplary first embodiment of the present invention.

The structure of the photonic signal processor is shown in FIG. 1. A broadband optical source 1, whose bandwidth is within the bandwidth of two identical LCFBGs 3, 5, is passed to a 3dB optical coupler 2, which splits the broadband source into two paths. The broadband source can be implemented by an EDFA ASE source followed by a spectrum flattening filter to both flatten the ASE spectrum and suppress the ASE outside of the LCFBGs.

Two split broadband sources are spectrum sliced by two thermally induced slicing filters based on array-heating LCFBG1 and LCFBG2, respectively. Each LCFBG 3, 5 is locally heated 4, 6 at several discrete points along its length to generate desirable wavelengths and magnitudes. The local thermal heating can be from a small thermal head, e.g. a fine resistive wire carrying a current and in localized contact with the LCFBG. The heating changes the local refractive index and introduces a phase shift at the contact point, which creates a narrow transmission window within the stopband of the grating.

Multi-tap WDM spectrum slicing can be obtained by using multiple heating heads to individually control the thermally induced phase shifts at sequential locations along the length of LCFBG, which generates multiple WDM transmission passbands. The two sets of WDM sources are then combined 7 and amplitude modulated with an RF input signal 8 using a dual input electro-optic modulator (EOM) 7 to provide 180° phase difference between two modulation arms and subsequently provide bipolar taps.

The output of the modulator is launched into a dispersive delay line 9 before being detected by a photodetector 10. The amplitude response of the microwave photonic filter is given by:

$$|H(\omega_m)| = R \left| \sum_{i=1}^{N} B_i W_i e^{j\omega_m \Delta t(i-1)} \right| \quad \text{Eqn (1)}$$

where $\omega_m$ is the angular modulation frequency, and $B_i W_i$ is the filter coefficient corresponding to $i^{th}$ wavelength. $B_i$ is the tap polarity parameter, where $B_i$ is 1 for taps corresponding to wavelengths entering from the upper input port via grating 3 of the EOM, and −1 for light entering the lower port via lower grating 5. $W_i$ is the optical power of the $i^{th}$ sliced source, and the factor R represents the dispersion induced RF distortion. The basic time delay of the filter is given by $\Delta t = D \Delta \lambda$ where D is the group delay of the dispersive medium, $\Delta \lambda$ is the wavelength spacing of the optical source, and the free spectral range (FSR) of the filter is FSR=1/$\Delta t$.

The amplitude of the spectrum slices can be controlled by adjusting the heating level of the thermal head, thus changing the filter weights ($W_i$) and reconfiguring the transfer function of the transversal microwave photonic filter. As the thermally induced phase shift occurs at the location of the heating points on LCFBG, the wavelength spacing of the sliced source ($\Delta \lambda$) can be adjusted by moving the heating point along the grating. This will change the FSR of the filter and consequently realizes tunability. Finally, if the induced temperatures are less than 570 K, the phase shifts in the grating are reversible, which gives the flexibility to implement tunable and reconfigurable microwave photonic filter by tuning the position and amount of the heat applied.

The operation and structure of the grating 5 and heaters 6 provide the ability to achieve spectrum slices for negative coefficients of the RF filter. Since spectrum slices for positive taps and negative taps have different central wavelengths, and the amplitude of each spectrum slice is designed according to the targeted filter coefficients, locations of the heaters can be different for each arm with the temperatures of the heaters controlled according to the required positive or negative coefficients. The dual input electro-optical modulator provides electrical to optical conversion and 180° phase difference between two modulation arms thereby providing the negative coefficients.

Alternative embodiments are possible. For example, other modulator configurations such as two modulators with opposite slopes DC-biases configuration can also be used in the design to replace the dual-input EOM. The structure uses two single-input single-output modulators which are operated at positive and negative slope of the signal's transfer function. The arrangement can be similar to that disclosed in: J. Capmany, D. Pastor, A. Martinez, B. Ortega, and S. Sales, "Microwave photonic filters with negative coefficients based on phase inversion in an electro-optic modulator," Optics Letters, vol. 28, pp. 1415-1417, Aug. 15 2003.

Figure 2:
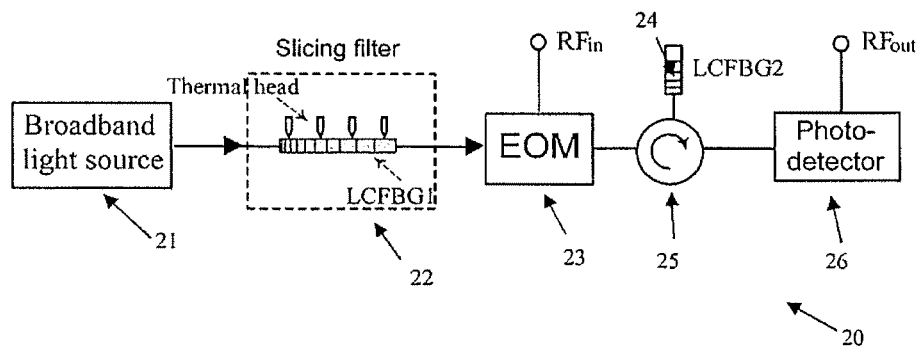
FIG. 2 is a schematic illustration of an exemplary alternative embodiment of the present invention.

Further, alternative embodiments are possible. For example, FIG. 2 illustrates an exemplary embodiment of a filtering structure containing only one LCFBG arm. A broadband ASE source 21 is spectrum sliced by a thermally induced slicing filter based on linear chirped fiber Bragg grating (LCFBG1 22) which is locally heated at several discrete points along its length. It is then amplitude modulated using an electro-optic modulator (EOM) 23, and is subsequently launched into a dispersive delay line (LCFBG2 24), via circulator 25 before being detected by a photodetector 26 and a corresponding signal output as RFout.

The local heating can be from a small thermal head, for example, a fine resistive wire carrying a current and in contact with the grating LCFBG1 22 which again changes the local refractive index and introduces a phase shift at the contact point, which creates a narrow transmission window within the stopband of the grating. Multi-tap WDM spectrum slicing is obtained by using multiple heating heads to individually control the thermally induced phase shifts at sequential locations along the length of LCFBG1 22, which generates multiple WDM transmission passbands. The broadband source bandwidth or the LCFBG2 bandwidth is chosen to be within the bandwidth of LCFBG1 in order to suppress the ASE outside of the slicing filter. The amplitude response of the filter will be in accordance with the previously discussed equation 1, with all positive coefficients ($B_i=1$).

According to an exemplary embodiment of the present invention, a prototype was constructed in accordance with the arrangement of FIG. 2. The LCFBG1 22 had 96% reflectivity, 211ps/nm group delay slope, and 4.6nm bandwidth. Four thermal heads made from NiCr wire were vertically placed on LCFBG1 to heat the grating at four points. The location of each thermal head can be precisely tuned and the width of the heat region of a single thermal head, estimated from diameter of the wire, was about 100μm. The current passing through each thermal head can be independently controlled using a variable current source, which in turn controlled the temperature change at each heating point. Heat sinks can be used in the fibre region between neighbouring resistance wires to reduce unwanted thermal feed through.

Figure 3:
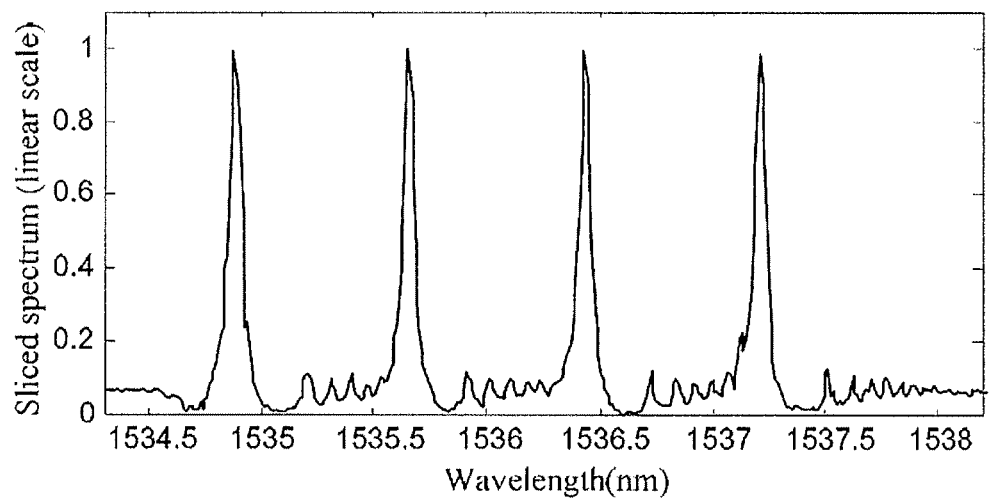
FIG. 3 illustrates a measured spectrum sliced source of the alternative embodiment.

A high power ASE source with 4nm bandwidth was used as source, which operated within the bandwidth of LCFBG1 22. By heating all the thermal heads, a four channel spectrum sliced source with uniform amplitude and wavelength separation of 0.78nm as shown in FIG. 3 was obtained. The measurement resolution was 10pm. The distance between neighboring thermal heads was 15.6mm. The small interchannel oscillations are caused by the Fabry-Perot cavity formed in LCFBG1 22, which can be reduced by using grating with higher reflectivity.

Figure 4:
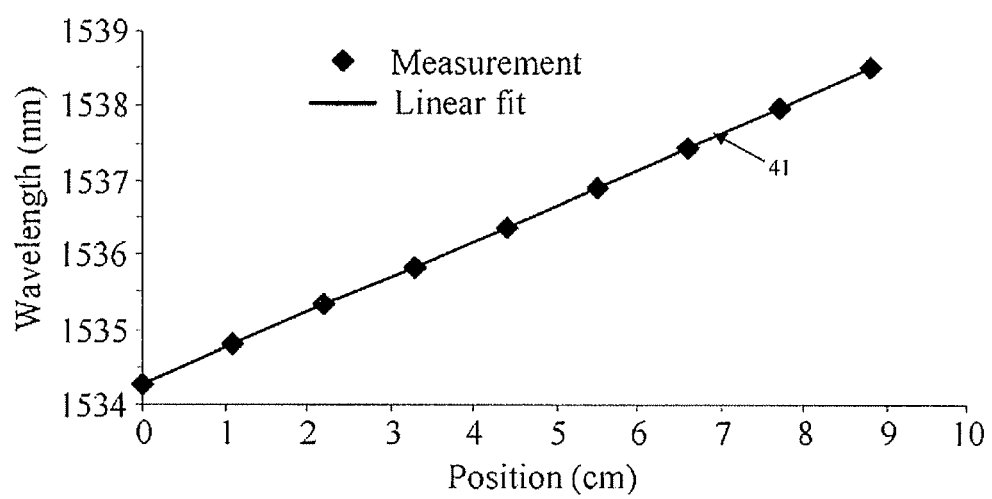
FIG. 4 illustrates the wavelength variation with a change in the heating position for the alternative embodiment.

FIG. 4 shows the relation between the slice wavelength and the heating position, which was obtained by scanning a thermal head along the whole bandwidth of LCFBG1 22. The line 41 in FIG. 4 has 0.5nm/cm slope. The linear relationship allows the slice wavelength to be chosen by selecting the position of thermal head on the grating. The realized prototype spectrum sliced source had a wavelength resolution of <10pm, enabling precise control of the basic time delay ($\Delta t$) for the targeted FSR and for realizing tunability of the photonic filter.

Figure 5:
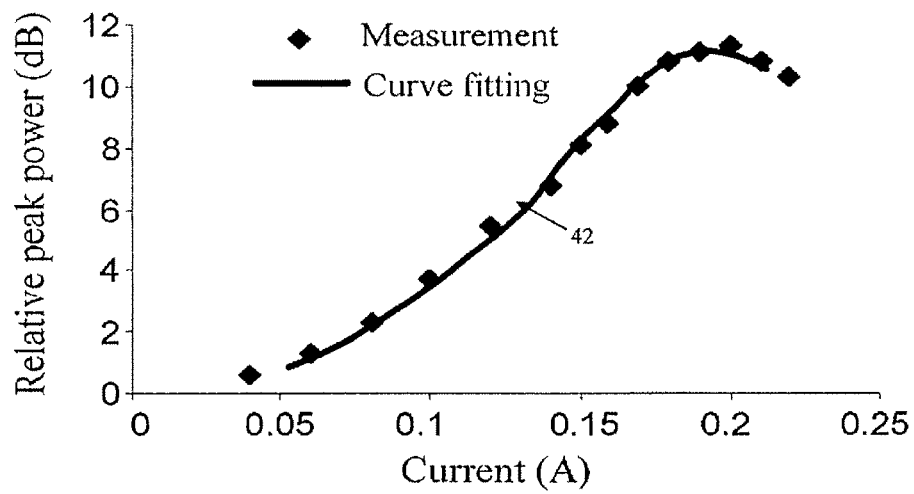
FIG. 5 illustrates driving current vs peak power of a sliced source of the alternative embodiment.

Adjustment of coefficients (Wi) of the microwave photonic filter can be obtained by changing the driving current of the thermal head. By fine tuning the location of the thermal head, the thermal induced wavelength shifting during adjustment of the magnitude of spectrum slices can also be overcome. FIG. 5 shows the peak power of the sliced source increases with driving current until the heat level reaches to give $\pi$ phase shift at a current of 0.2A. The relation is nearly linear when the driving current is within the range of 0.06A to 0.17 A.

Figure 6:
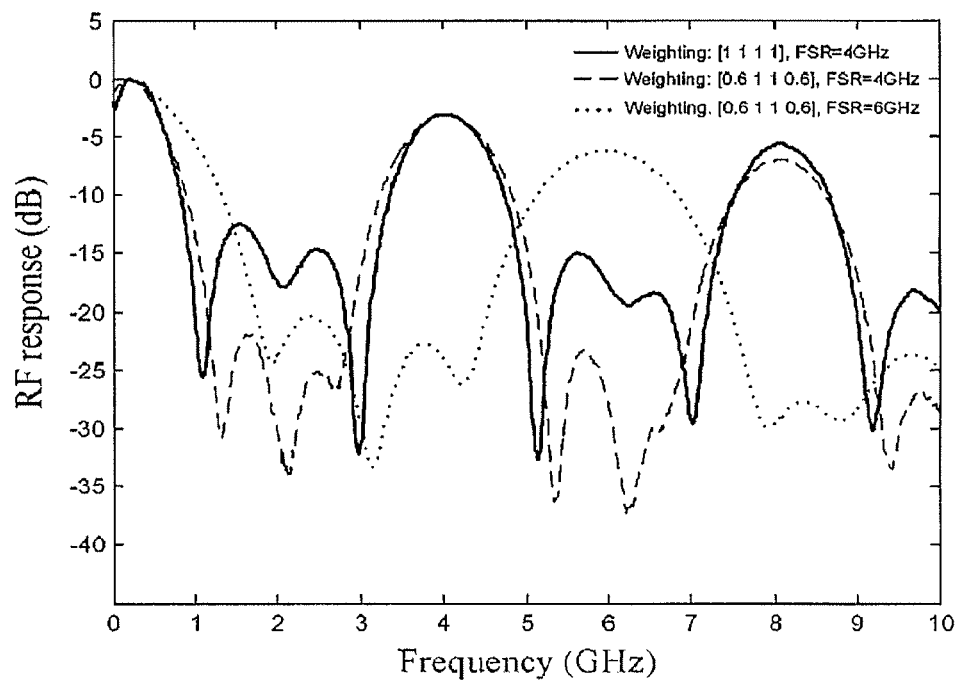
FIG. 6 illustrates a frequency response of a filter of the alternative embodiment.

A microwave photonic filter was constructed by using LCFBG2 24, having a dispersion of 320ps/nm, as the dispersive delay line. FIG. 6 shows the measured RF responses of the filter. An RF filter with 4GHz FSR and uniform weighting and equal wavelength spacing (0.78nm) was demonstrated; an RF filter with windowing function [0.6 1 1 0.6] which was realized by adjusting the driving current of the thermal head to control the power of the sliced source, demonstrated about 20dB sidelobe suppression; and finally an RF filter with a different FSR of 6GHz, obtained by adjusting the location of the thermal head to relocate optical wavelengths of the sliced source to a wavelength spacing of 0.52nm.

Figure 7:
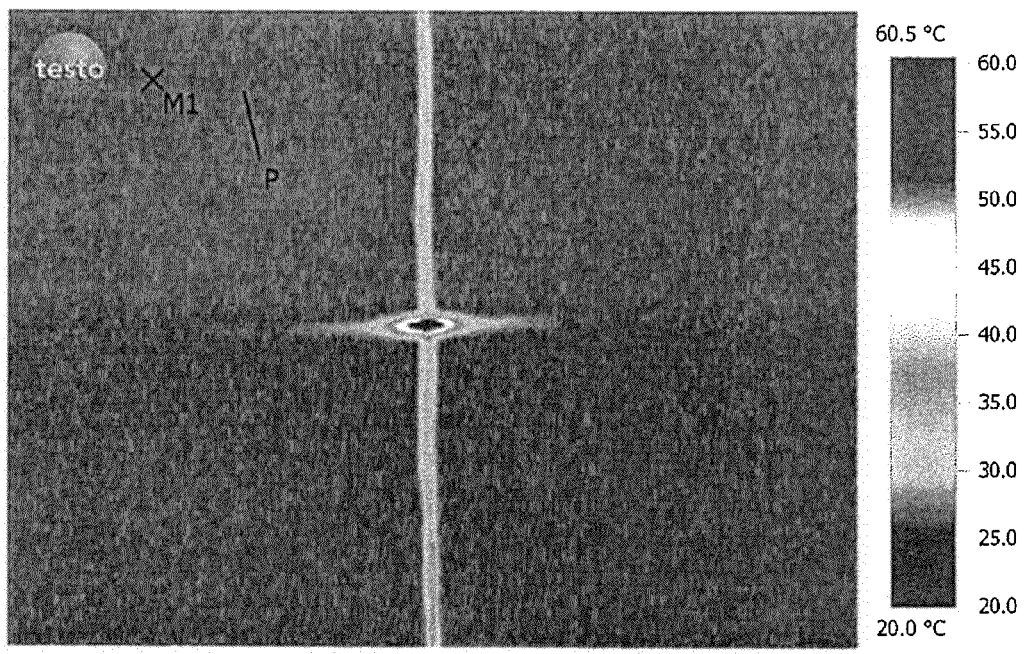
FIG. 7 illustrates the thermal camera output of a fibre heating wire heating a fibre grating, according to an exemplary embodiment of the present invention.

Additionally, localized heating was conducted utilising a NiCr wire. In this arrangement, the relative optical power of the output spectrum slice was increased with driving current until a heat level was reached which gave a $\pi$ phase shift. FIG. 7 illustrates a 2-D heat distribution from a thermal camera when a NiCr wire with a diameter of 100pm was utilised to locally heat a linearly chirped grating to generate a $\pi$ phase shift. The grating utilized had greater than 99.9% reflectivity, 150ps/nm group delay slope and 6nm bandwidth.

Figure 8:
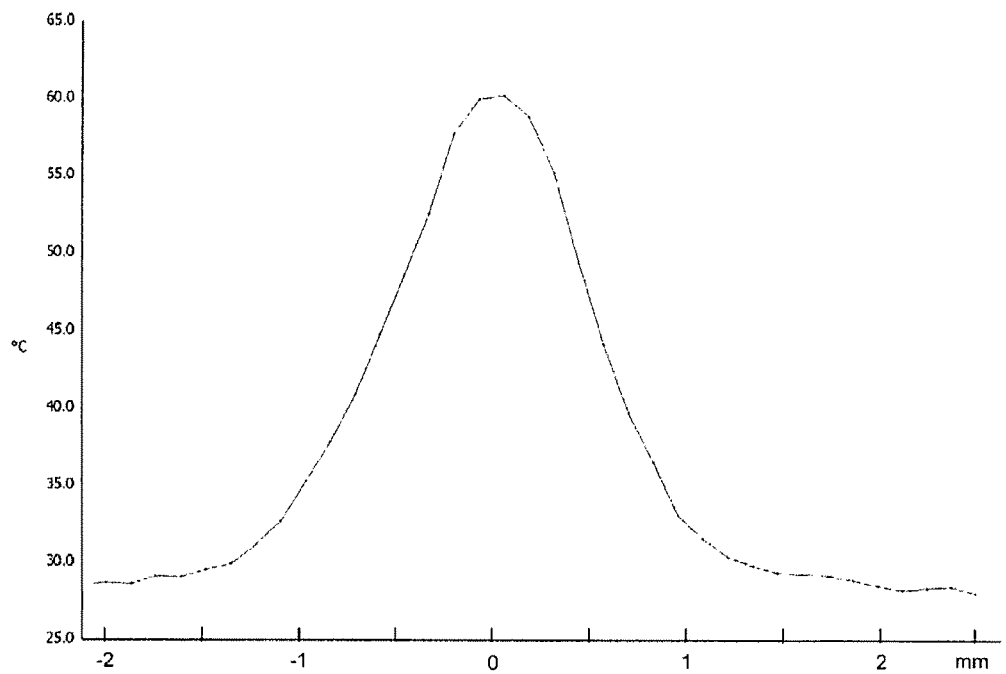
FIG. 8 illustrates a plot of thermal measurements along a fibre.

The sectional heat distribution along the fiber grating was also obtained and is shown in FIG. 8. The y-axis is the recorded temperature and x-axis shows the relative heating distance along the grating. It can be seen that the heat shows a Gaussian distribution profile and the maximum required heat to create an approximately $\pi$ phase shift is 60 degree Celsius.

The interchannel oscillations caused by the F-P cavity can be neglected due to the usage of high reflective gratings. The usage of high reflective grating reduces the interchannel oscillations and narrows the bandwidth of the sliced source, which ease the dispersion induced RF degradation effect consequently.

Figure 9:
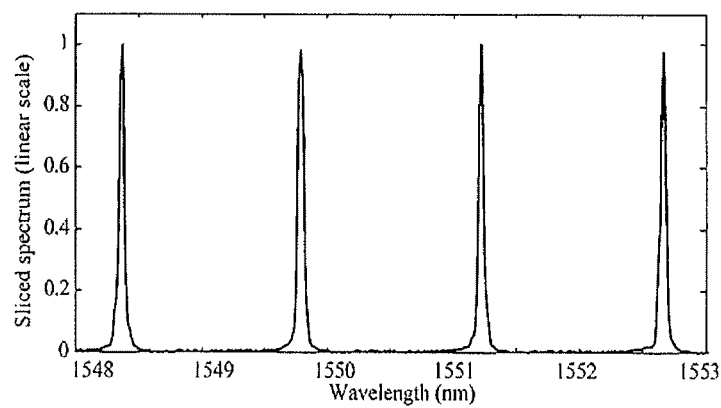
FIG. 9 illustrates the resultant spectrum as a result of localised fibre heating.

The resulting spectrum sliced source obtained by locally heating a linearly chirped fiber Bragg gratings at 4 discrete locations is shown in FIG. 9 which clearly illustrates the resulting transmission windows. As noted previously, the grating had greater than 99.9% reflectivity, 150ps/nm group delay slope and 6nm bandwidth.

Figure 10:
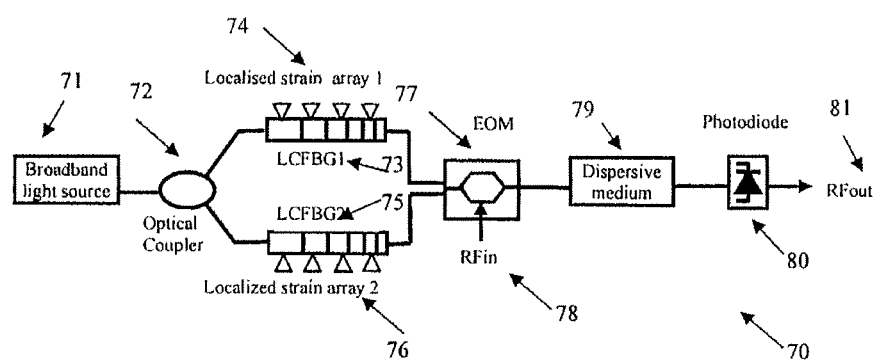
FIG. 10 illustrates schematically an implementation of an exemplary embodiment of the present invention.

Other forms of localized manipulation of the grating structure are possible. For example, FIG. 10 illustrates a similar arrangement to FIG. 1, however, in this case, the localized change is implemented by a localized strain applied to the grating. The localized change can be implemented by applying a localized pressure but means of a piezoelectric ceramic or a mechanical pressing device to the gratings 74, 76, thereby providing a stretch of compression to the grating to generate a requisite optical phase shift.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Although the present invention has been described with particular reference to certain preferred embodiments thereof, variations and modifications of the present invention can be effected within the spirit and scope of the following claims.

We claim:

1. A method of filtering an external input signal, the method comprising:
   (a) receiving the external input signal, which is a signal to be processed;
   (b) providing a photonic drive signal having a predetermined wavelength range,
   (c) filtering the photonic drive signal utilising a Bragg grating structure having a series of localised modifications to the periodicity of the Bragg grating structure so as to provide a predetermined transmission output window within the stopband of the Bragg grating structure to provide a filtered modulator signal; and
   (d) utilising a modulator to modulate the external input signal based on input from the filtered modulator signal so as to provide a modulated output.

2. The method as claimed in claim 1, further comprising;
   (e) applying a wavelength variable delay to the modulated output to provide a delayed modulated output; and
   (f) determining the time varying intensity of the delayed modulated output.

3. A photonic signal manipulation apparatus, comprising:
   an input for receiving an external input signal, which is a signal to be processed by the apparatus;
   a photonic drive signal having a predetermined wavelength range,
   a Bragg grating structure interconnected to the photonic drive signal and having a series of localised modifications to the periodicity of the Bragg grating structure so as to provide a modulator signal from the photonic drive signal having a predetermined transmission output window within the stopband of the Bragg grating structure and predetermined wavelength range;
   a modulator interconnected to the Bragg grating structure for modulating the external input signal based on input from the modulator signal.

4. The apparatus as claimed in claim 3 further comprising:
   a delay structure for providing a wavelength variable delay to the output from the modulator; and
   an intensity detector interconnected to the delay structure for determining and outputting the intensity of the delay structure output.

5. The apparatus as claimed in claim 3, wherein the localised modification is provided by localised heating of the Bragg grating structure.

6. The apparatus as claimed in claim 5, wherein the localised heating changes the refractive index at the localised point thereby introducing a phase shift in the grating at the localised point.

7. The apparatus as claimed in claim 6, wherein the manipulation of the phase control is performed by predetermined profile of heating distribution.

8. The apparatus as claimed in claim 7, wherein localised heating distribution can be individually modified from selected heating width and heat.

9. The apparatus as claimed in claim 5, wherein the degree of heating controls the amplitude of a Bragg transmission window and the location of the heating controls the wavelength of the transmission window.

10. The apparatus as claimed in claim 3, wherein the localized modification is provided by localized pressure applied to the Bragg grating structure.

11. The apparatus as claimed in claim 3, wherein the Bragg grating structure includes a first and second chirped Bragg grating on separate interconnected arms with one arm providing a 180 degree phase difference output to the other arm, thereby providing negative coefficient outputs for an optical filter.

12. The apparatus as claimed in claim 3, wherein the localised modification is variable in intensity and reversible.

13. The apparatus as claimed in claim 3, wherein said Bragg grating structure is a chirped Bragg grating.

14. The apparatus as claimed in claim 3, wherein said the predetermined wavelength range is covered by:

(a) a single long chirped Bragg grating or a cascade of multiple chirped Bragg grating.

15. The apparatus as claimed in claim 3, wherein the delay structure comprises a reflection Bragg grating.

16. A photonic signal processor providing finite impulse response filtering of an external input signal, the processor comprising:

an input for receiving the external input signal, which is a signal to be processed by the processor;

a photonic drive signal having a predetermined wavelength range, a Bragg grating structure interconnected to the photonic drive signal and having a series of localised modifications to the periodicity of the Bragg grating structure so as to provide a modulator signal having a predetermined transmission output window within the stopband of the Bragg grating structure and predetermined wavelength range;

a modulator interconnected to the grating structure for modulating the external input signal based on input from the modulator signal;

a delay structure for providing a wavelength variable delay to the output from the modulator; and an intensity detector interconnected to the delay structure for determining and outputting the intensity of the delay structure output.

\* \* \* \* \*